March 14, 1933.  A. K. TAYLOR  1,901,677
MATERIAL FORWARDING MECHANISM
Filed Dec. 8, 1930   13 Sheets-Sheet 3
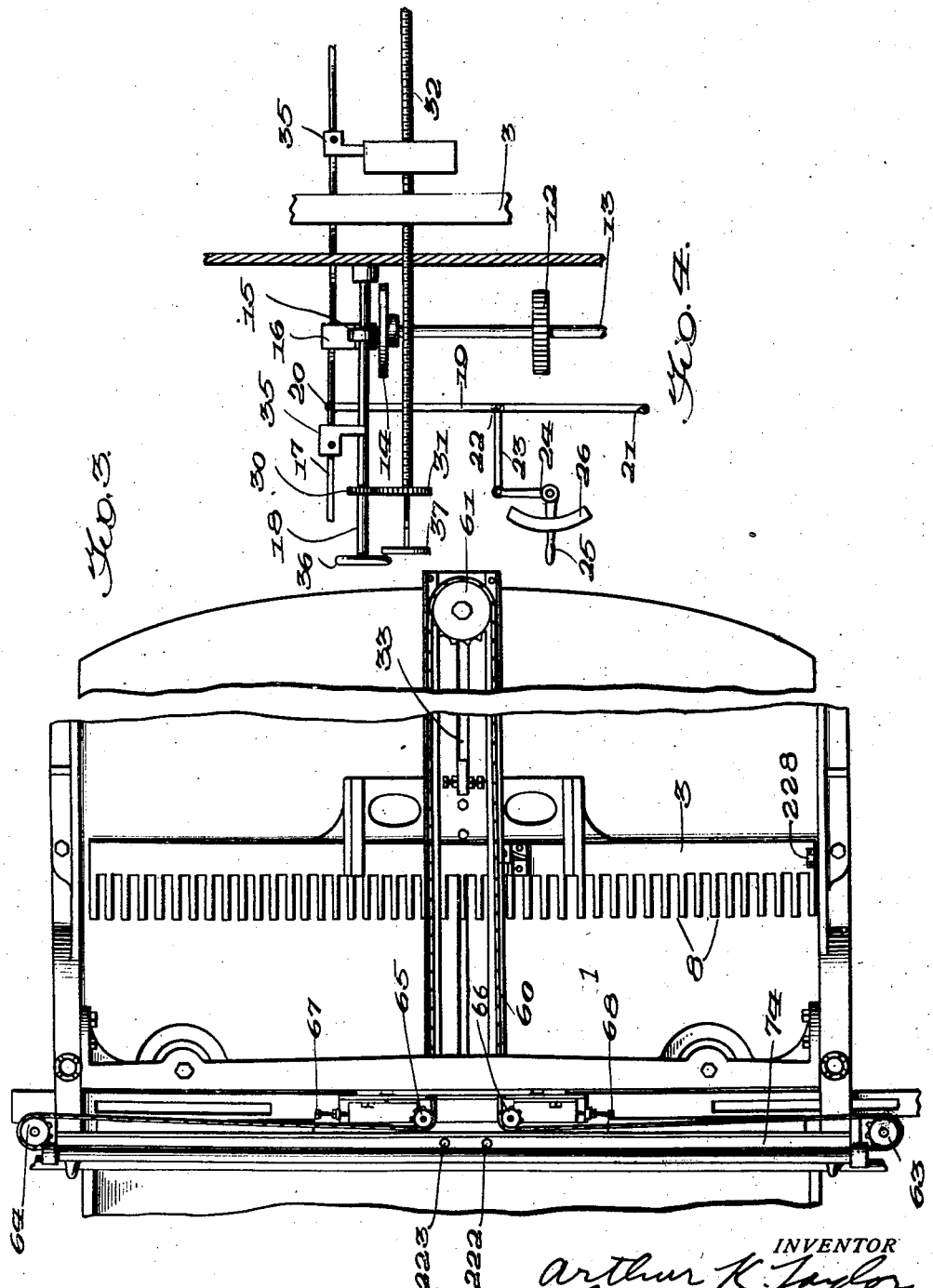
INVENTOR
Arthur K. Taylor
BY Thomas W. Clark
ATTORNEY

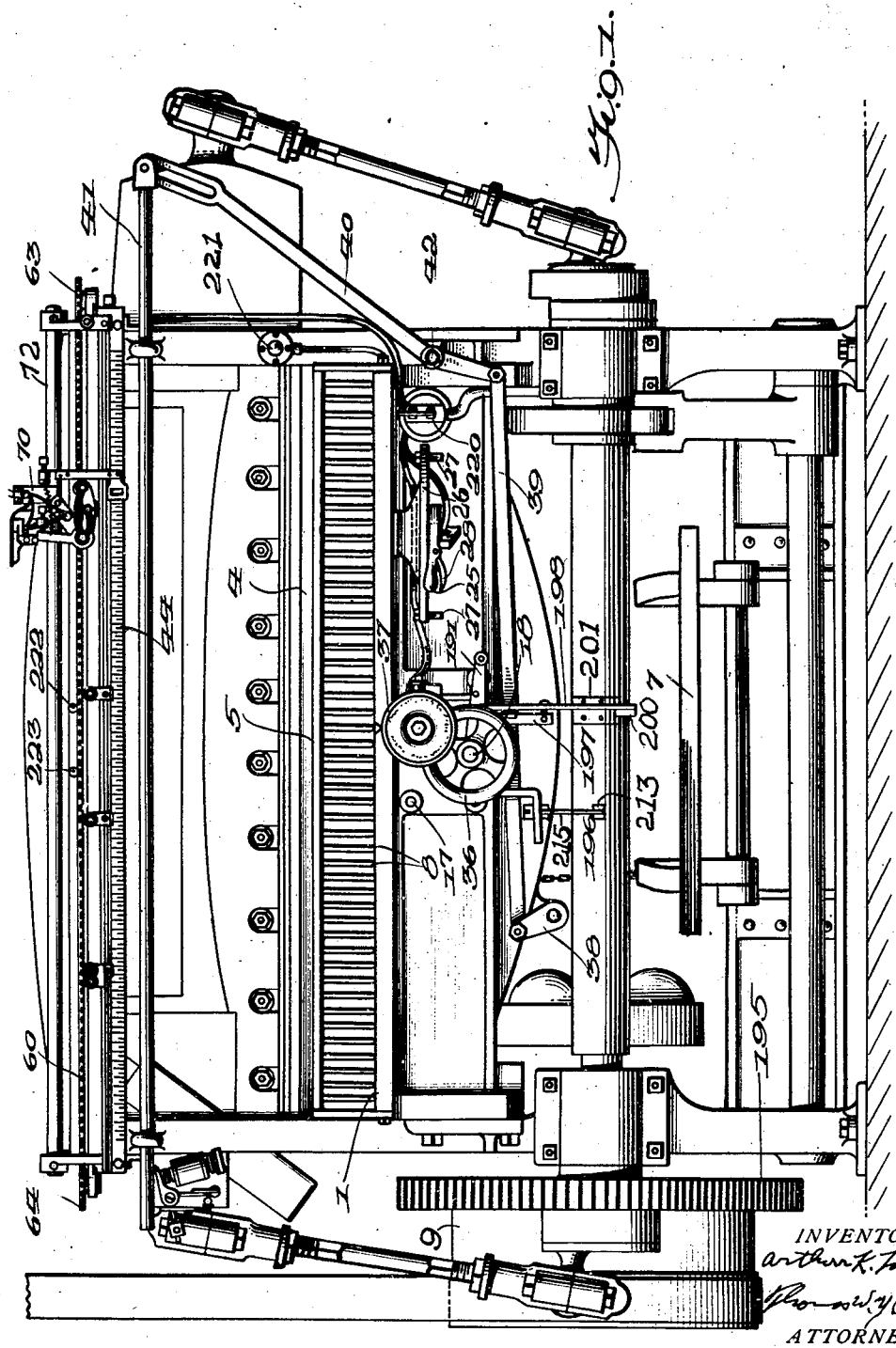

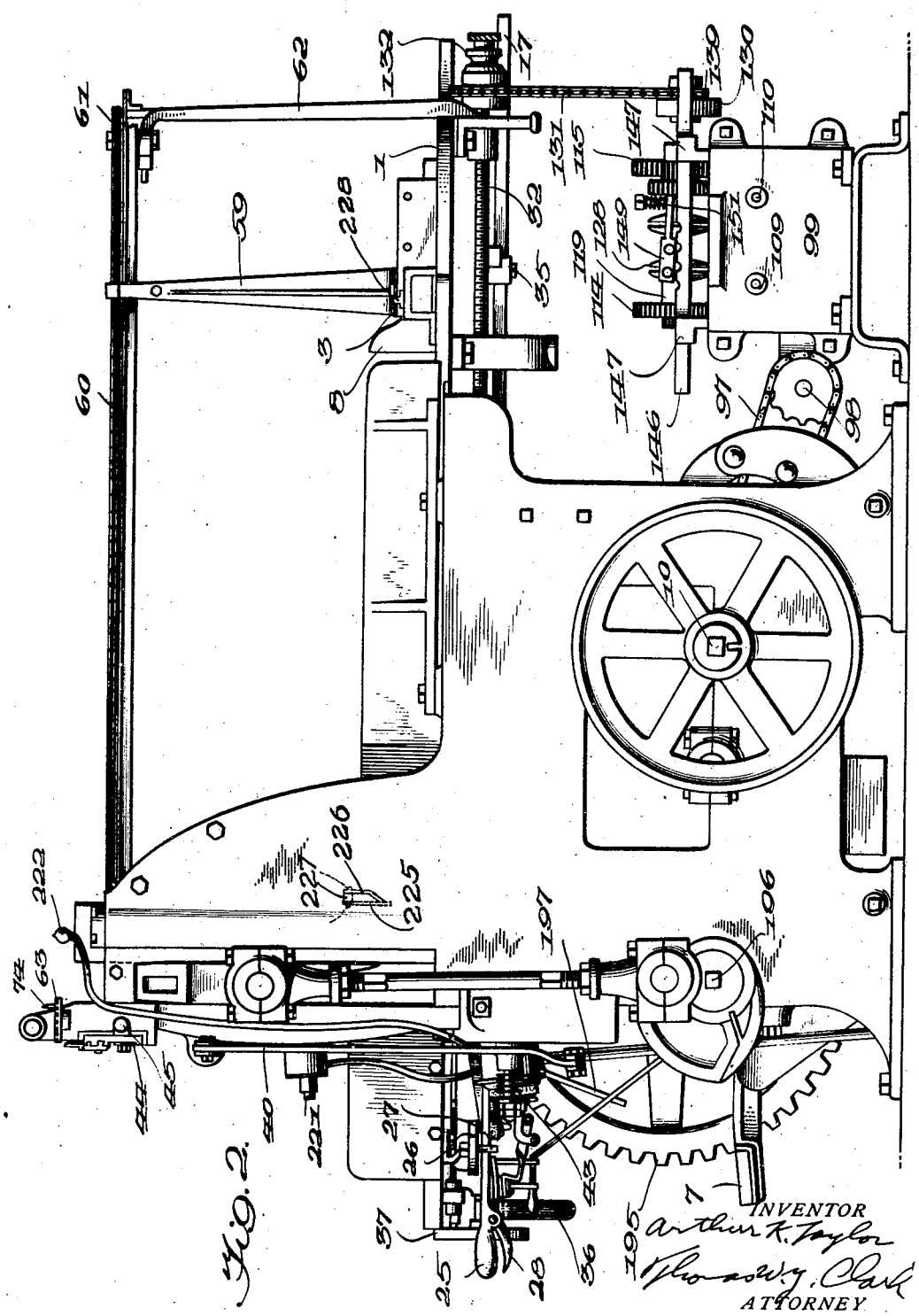

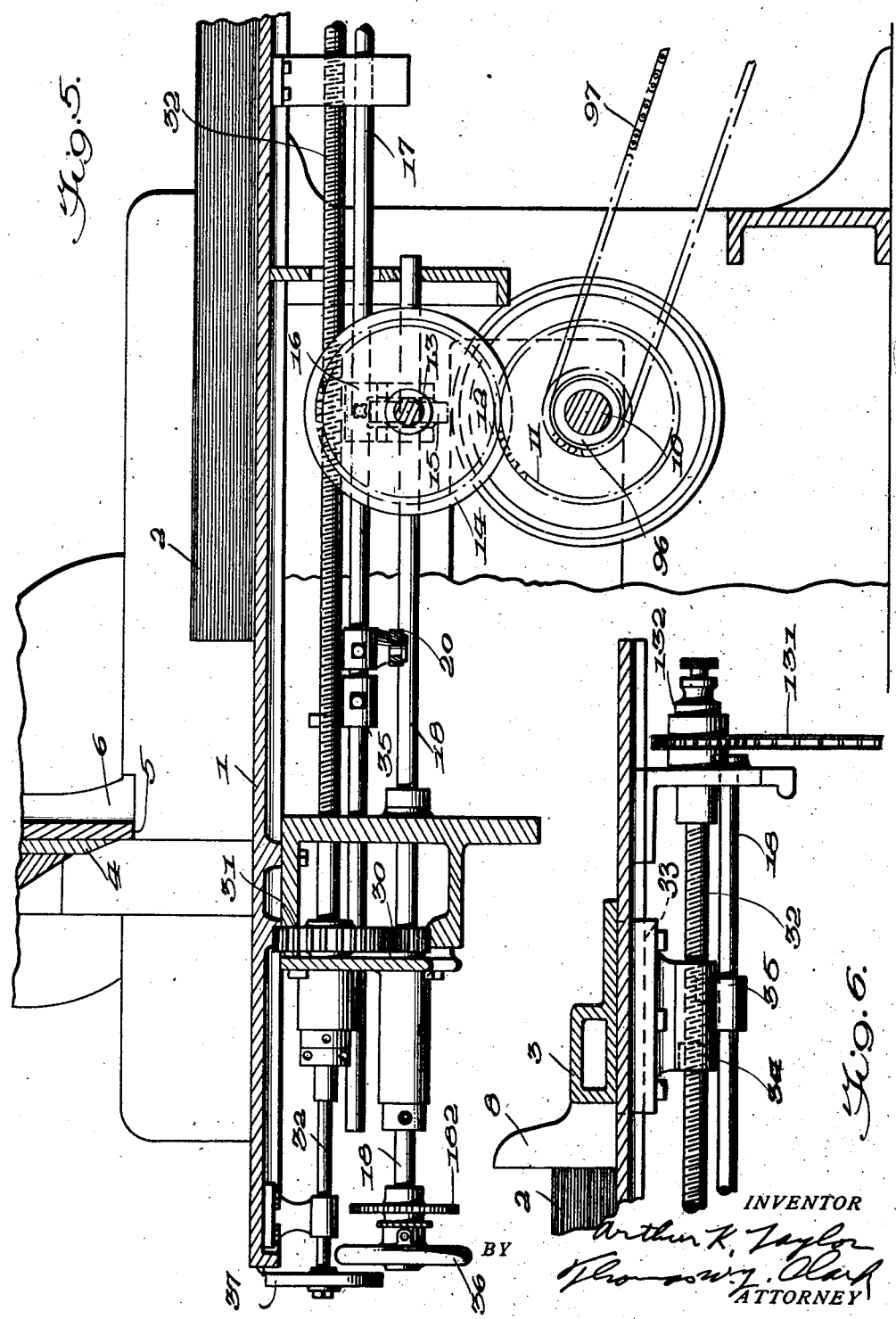

March 14, 1933.     A. K. TAYLOR     1,901,677
MATERIAL FORWARDING MECHANISM
Filed Dec. 8, 1930     13 Sheets-Sheet 6
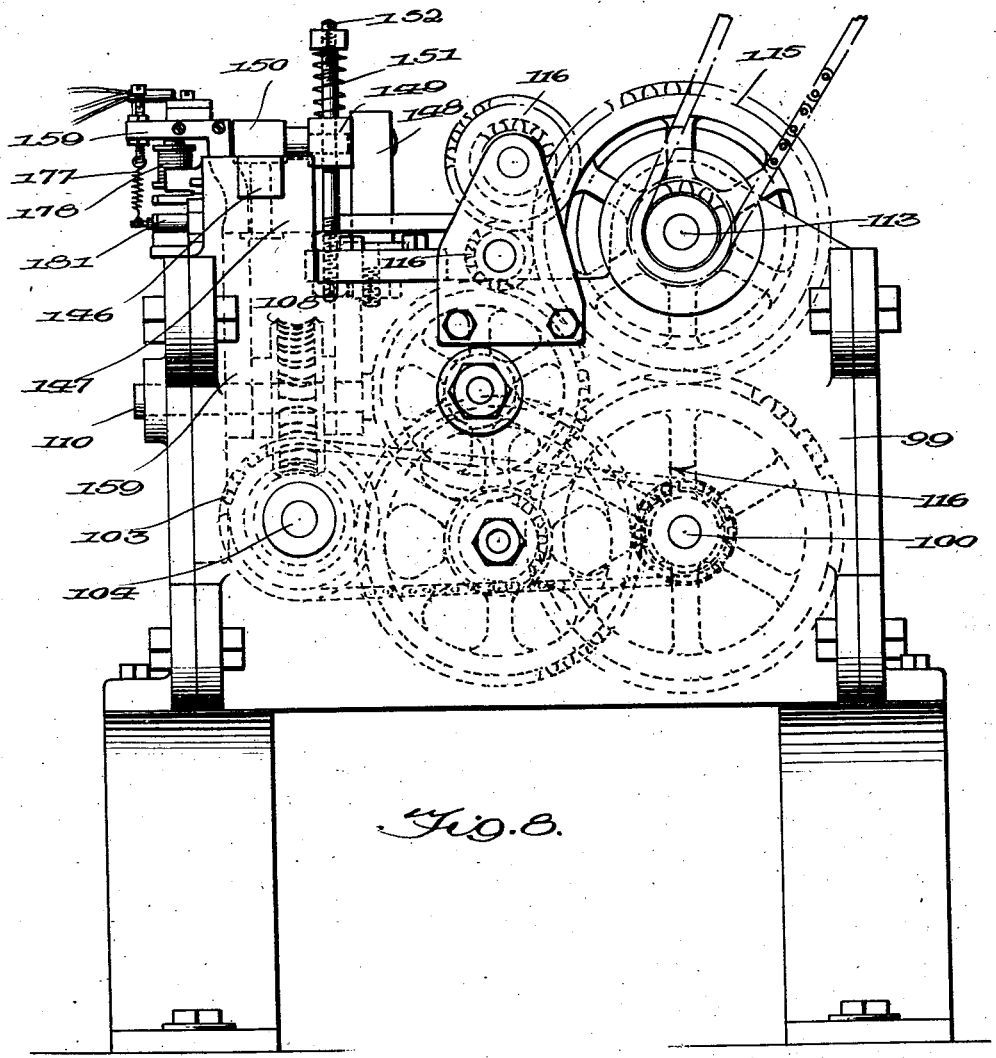
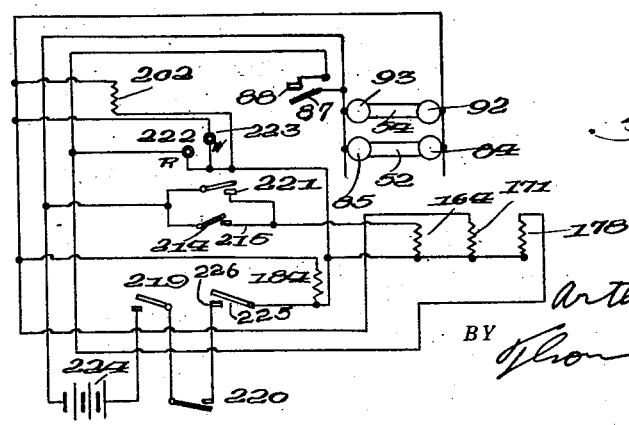

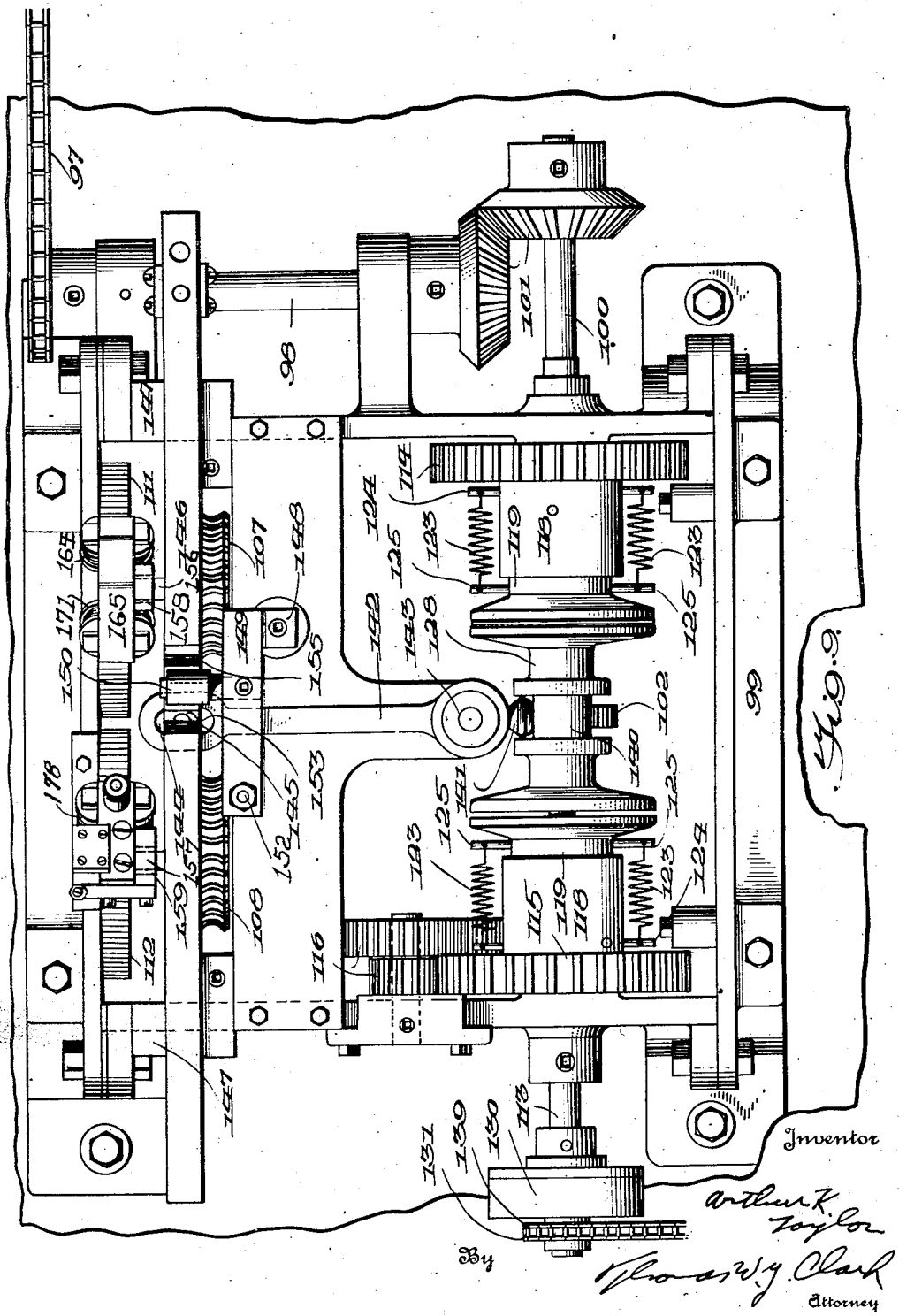

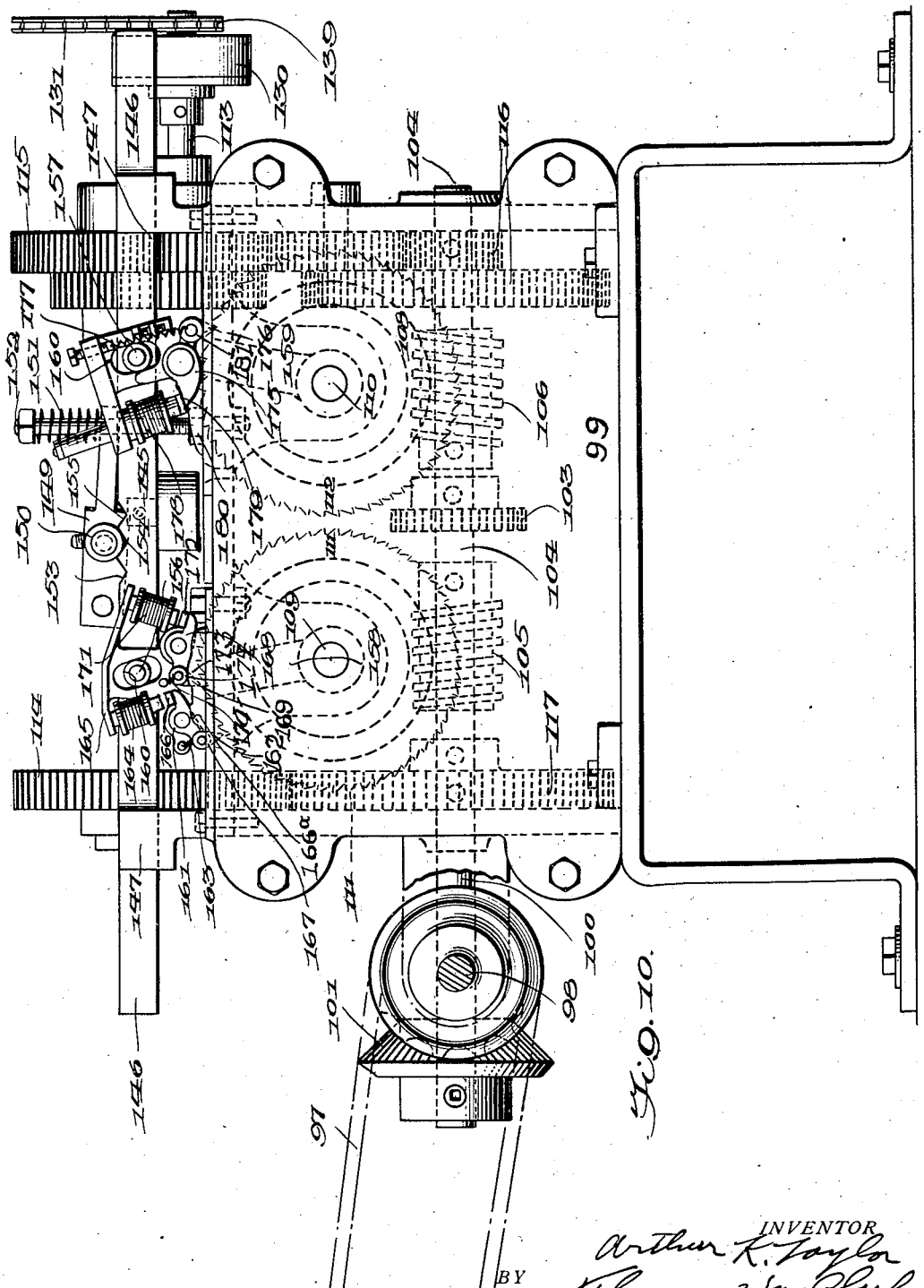

March 14, 1933. A. K. TAYLOR 1,901,677
MATERIAL FORWARDING MECHANISM
Filed Dec. 8, 1930 13 Sheets-Sheet 9
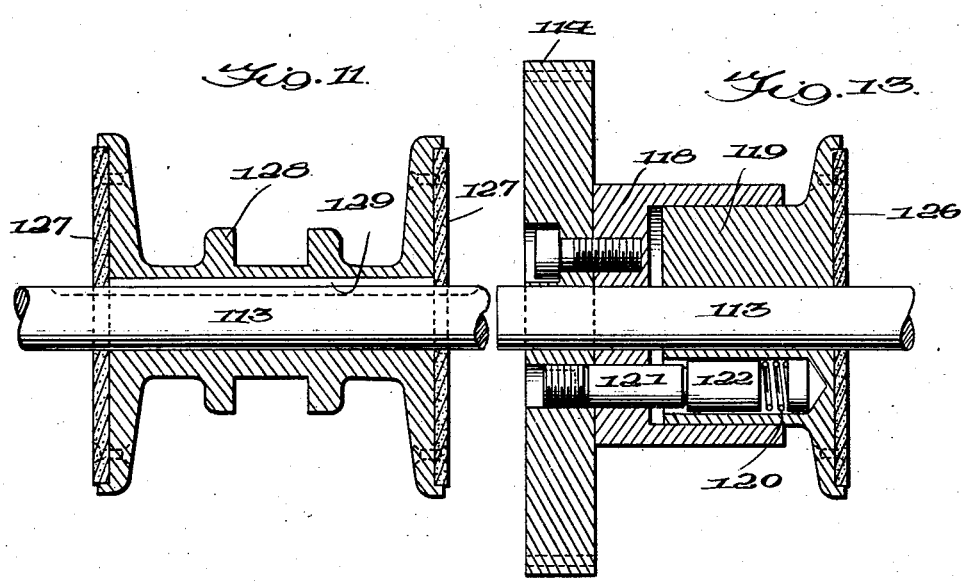
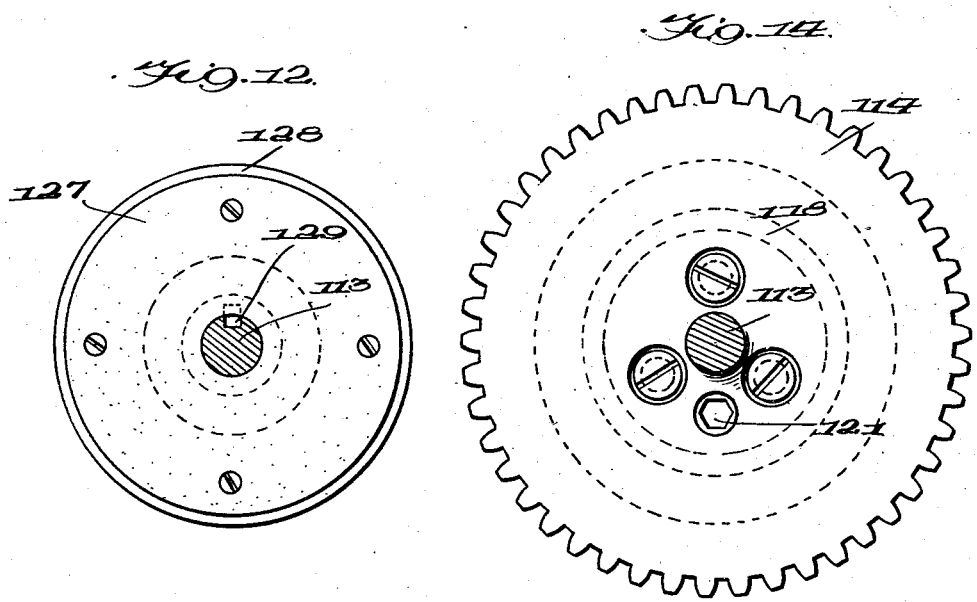

March 14, 1933.  A. K. TAYLOR  1,901,677
MATERIAL FORWARDING MECHANISM
Filed Dec. 8, 1930   13 Sheets-Sheet 10
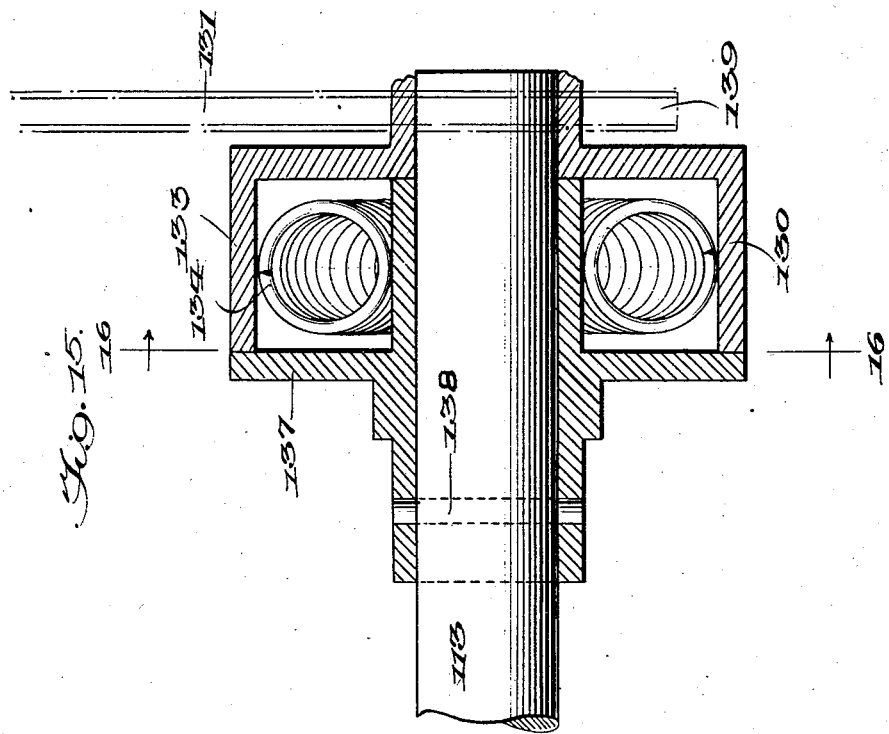
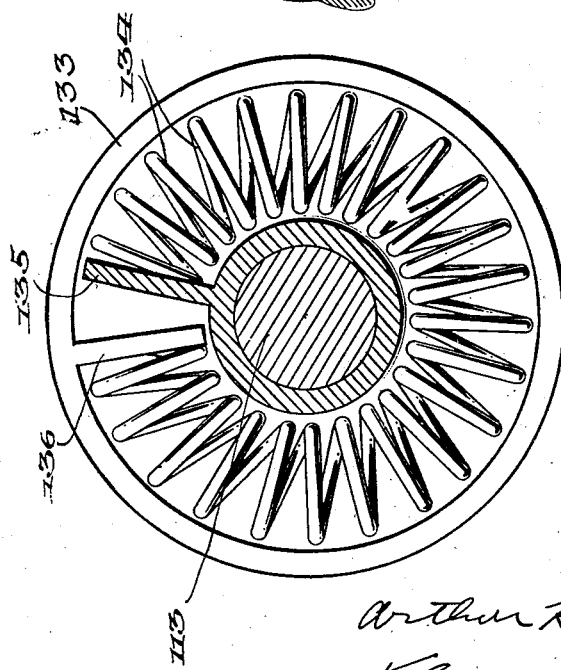
Inventor
Arthur K. Taylor
By Thomas W. Y. Clark
Attorney March 14, 1933.   A. K. TAYLOR   1,901,677
MATERIAL FORWARDING MECHANISM
Filed Dec. 8, 1930   13 Sheets-Sheet 11
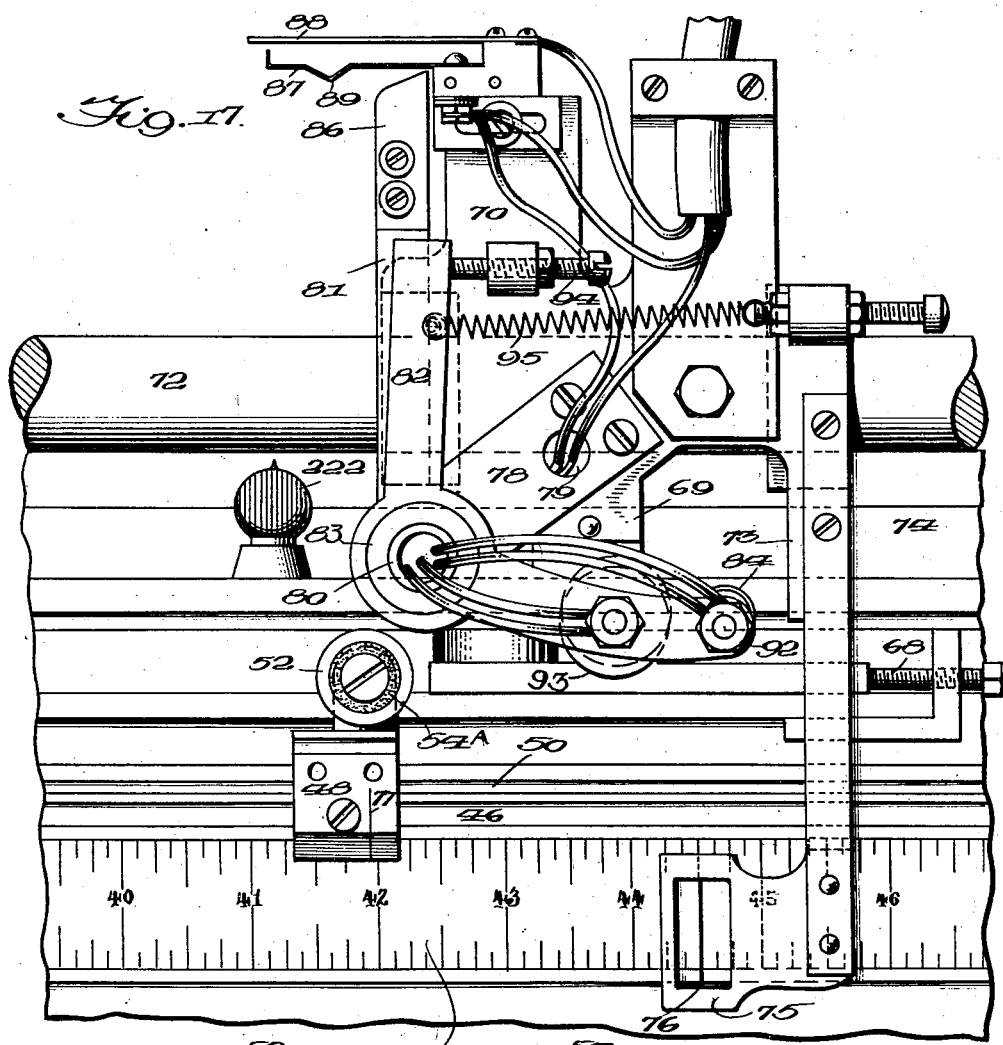
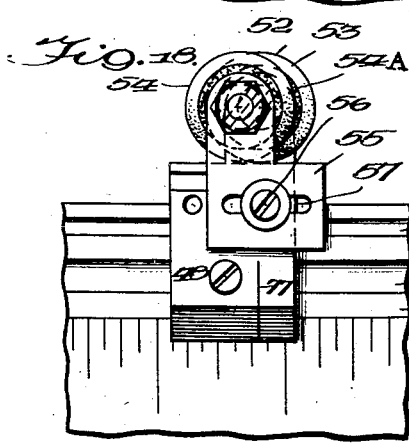
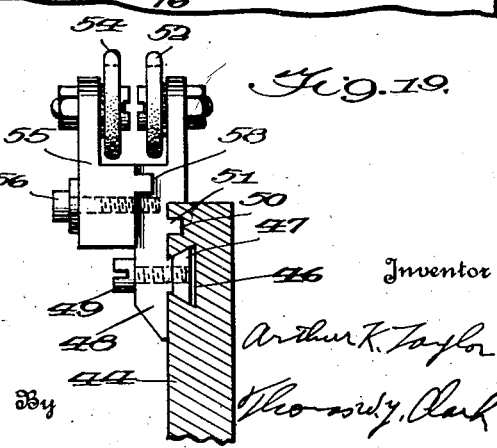
Inventor
Arthur K. Taylor
By Theodore J. Clark
Attorney March 14, 1933.  A. K. TAYLOR  1,901,677

MATERIAL FORWARDING MECHANISM

Filed Dec. 8, 1930  13 Sheets-Sheet 12

INVENTOR
BY Arthur K. Taylor
Thomas W. Clark
ATTORNEY

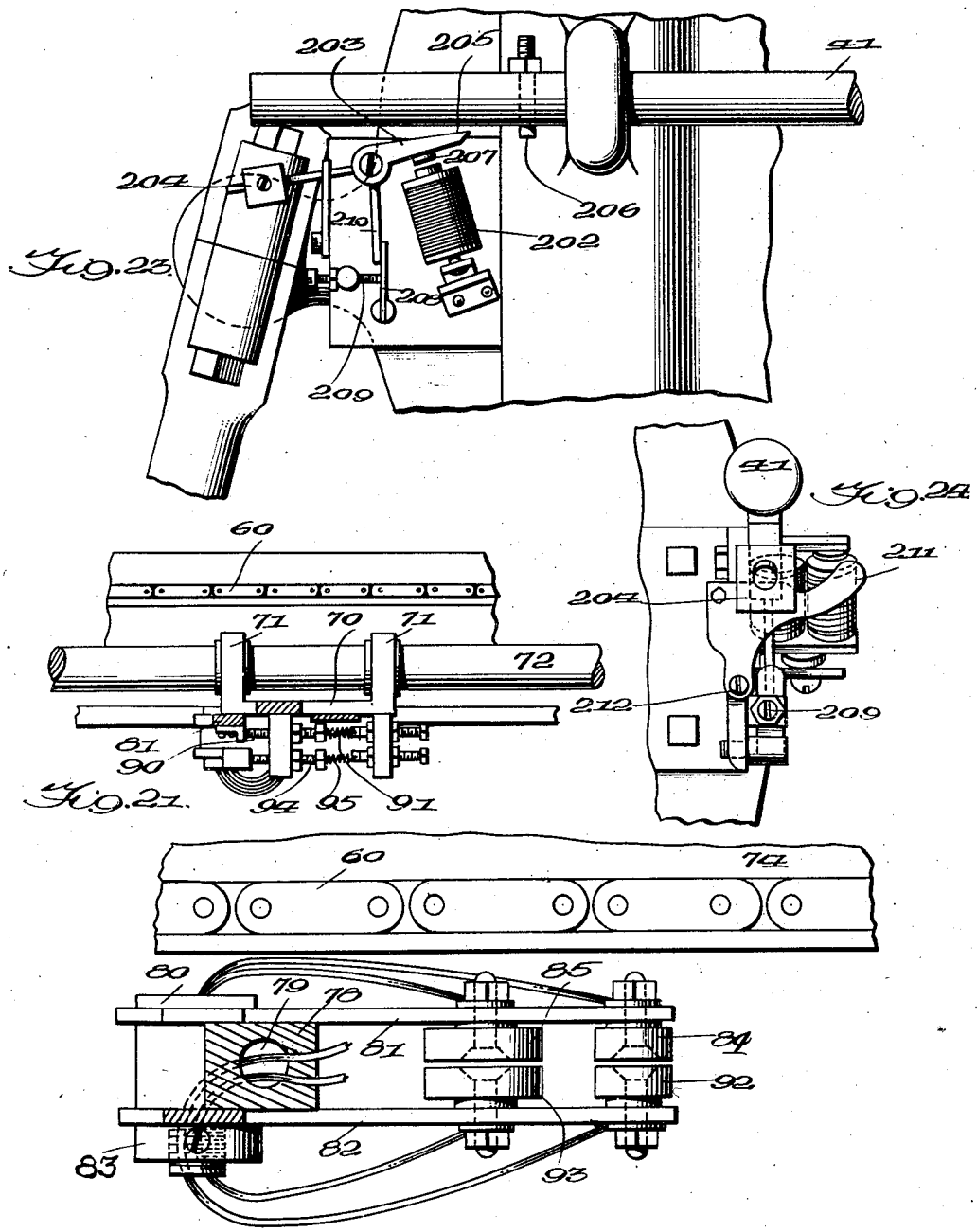

Patented Mar. 14, 1933

1,901,677

UNITED STATES PATENT OFFICE

ARTHUR K. TAYLOR, OF BALTIMORE, MARYLAND

MATERIAL FORWARDING MECHANISM

Application filed December 8, 1930. Serial No. 500,796.

My invention relates to machines for accurately placing sheet material relatively to cutting means to insure the cut taking place at exactly the desired place, and to certain details to attain that end.

Especially in label cutting is it desirable to cut, uniformly, many stacks of sheets of paper into smaller parts. Some of the cuts may be uniformly spaced, but often the labels are printed in different positions on the sheet, in order to utilize the whole sheet, and then the cuts are not only not uniformly spaced, but many of them are quite close together. My invention will enable the operator to make such cuts uniformly accurate and to make the sheet feeding and stopping automatic or semi-automatic, as may be desired.

Objects of the invention are to provide a mechanism to accurately indicate when a predetermined position has been reached in moving the material toward the cutting means by both scales and signals, and to stop the material moving mechanism at a predetermined position; to feed the material to be cut forward at a fixed relatively high speed and to slow down that speed an appreciable distance before the proper cutting position is reached, to make such a mechanism that will repeat this series of motions at either regular or irregular, very long or very short intervals until the material on the machine has been cut up as desired; to provide a mechanism that will automatically release the sheet forwarding stopping means and start the sheet forwarding mechanism after completion of a cutting operation, to locate the adjustable or settable parts of such a machine in convenient reach of the operator, to provide such a mechanism that may be so disconnected from the usual operating parts of the machine that they may operate substantially unhindered, and without the mechanism, to provide the mechanism with means to render it ineffective, so that the sheet forwarding means may be returned to its initial or an intervening position, to provide a mechanism which may be driven from the cutting machine, different from the drive of the usual sheet forwarding means, to provide an electrical contact that will complete a circuit for a very short period of time and during ery short distance of movement of the sheet forwarding means, to provide mechanism to prevent a cut by the operator at other than the right time, to provide such a mechanism that all, or any desired part, may be put on cutting machines now in use, without material alteration of the old structure, to provide a forwarding mechanism that may be operated automatically or semi-automatically, as may be desired.

Other objects and advantages of the invention and novel combinations of parts will be described in the detailed specification and pointed out in the appended claims.

In the accompanying drawings, forming a part hereof and showing one embodiment of the invention, Figure 1 is a front elevation of a paper cutting machine embodying my invention;

Fig. 2 is a side elevation thereof.

Fig. 3 is a plan view of the machine, partly broken away, showing the moving mechanism for the electrically energized members.

Fig. 4 is a diagrammatic plan view of the paper forwarding drive.

Figs. 5 and 6 are longitudinal cross sections of the machine showing the paper forwarding drive.

Fig. 8 is a rear elevation of the mechanism connected to the paper forwarding drive for automatically starting and stopping the drive.

Fig. 9 is a top plan view of the same.

Fig. 10 is a side elevation thereof, partly broken away.

Fig. 11 is a cross sectional view of the movable clutch for the same.

Fig. 12 is an end view of the clutch face.

Fig. 13 is a cross sectional view of one clutch face and gear.

Fig. 14 is an outer end view thereof.

Fig. 15 is a cross sectional view of the shock absorber in the drive mechanism.

Fig. 16 is a view on line 16—16 thereof.

Fig. 17 is a detailed front elevation of the electrically energized members and stops.

Fig. 18 is a front view of the two stops for effecting two cuts close together.

Fig. 19 is a side view thereof.

Fig. 21 is a fragmentary plan view thereof.

Fig. 22 is a fragmentary plan view thereof, partially in section.

Fig. 23 is a front view of the knife draw bar lock.

Fig. 24 is a side view thereof.

Fig. 26 is a diagram of the electric circuits.

In the drawings, similar numerals refer to similar parts throughout the several views.

Figure 7:
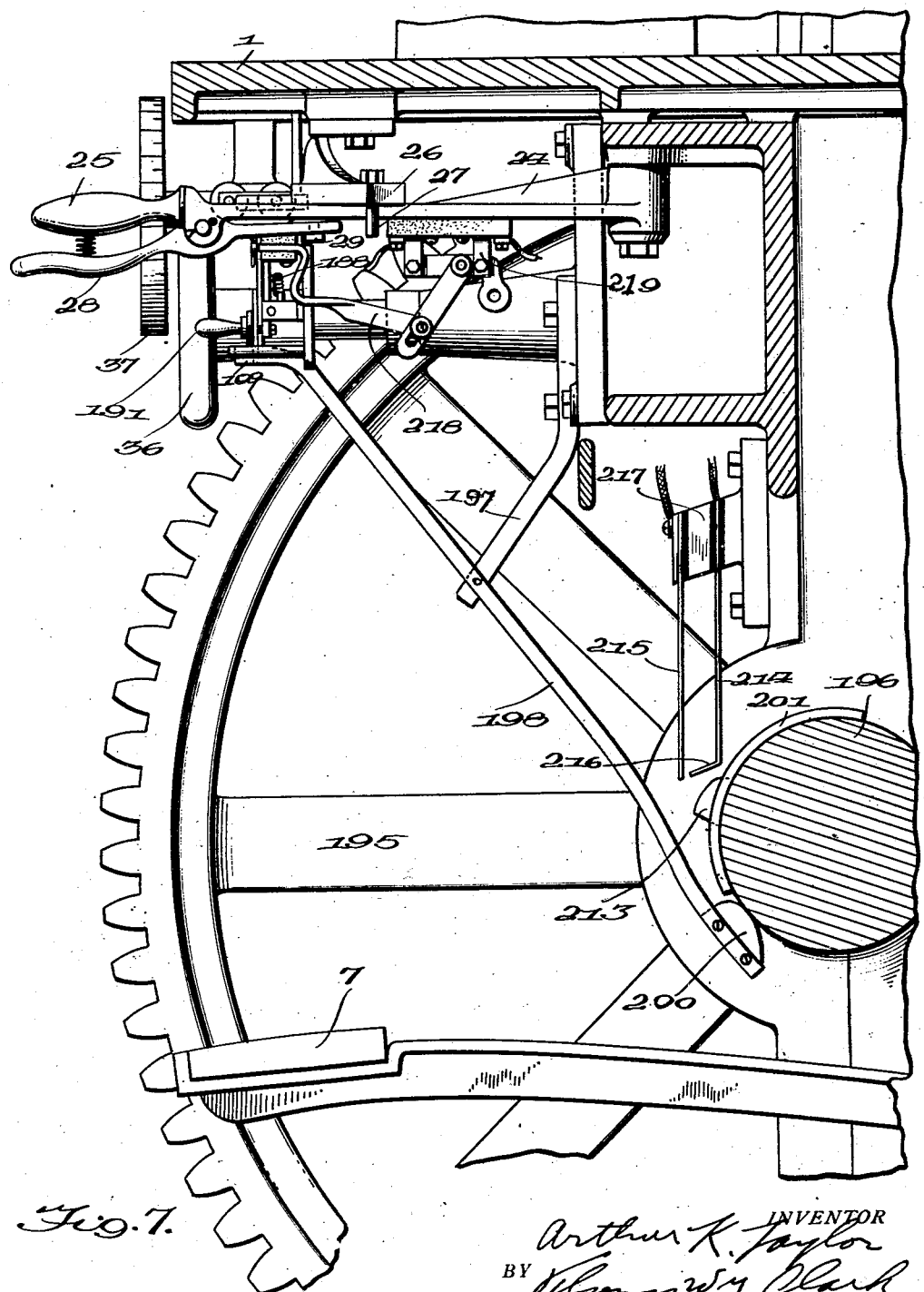
Fig. 7 is a fragmentary side cross sectional view showing principally certain of the front operating levers.

My invention is illustrated as applied to a paper cutting machine which is old and well known in the art, and only such details thereof as are necessary for a complete understanding of the invention will be described.

On the bed 1 of the machine, a stack of sheets 2 is placed, and it is moved forward by a feed bar 3 to a knife 4 which cuts the sheets as desired. To hold the sheets down while the cutting is being done, clamp 5, having spaced fingers 6, is let down on the paper. Foot treadle 7 is one mechanism for letting the clamp down. Feed bar 3 also has fingers 8 which are alternately placed to interfinger with the fingers on the clamp to allow the last paper in front of the feed bar to be cut.

Pulley 9 on shaft 10 is constantly driven from a suitable source of power. Also on shaft 10 is gear 11, which drives gear 12 on shaft 13. At one end of shaft 13 is friction disk 14 over the face of which friction roller 15 may be drawn by double yoked bracket 16 fixedly mounted on shaft 17. Friction roller 15 is keyed to rotate shaft 18 and is longitudinally slidable thereon. The axis of rotation of shaft 18 would be intersected by that of shaft 13 were the latter prolonged, therefore, moving the friction roller over the friction disk will drive shaft 18 in either direction, depending on which side of the center of the disk the roller is, or if the roller is in the center of the disk, shaft 18 will remain stationary. Rod 17 may be moved longitudinally by lever 19, having in its end an elongated slot pivoted to rod 17 at 20. At the other end 21, rod 19 is pivoted to the under side of the bed 1. Lever 19 has pivoted near its center at 22 link 23 which is drawn back and forth by bell crank 24, having hand piece 25.

Bell crank 24 may be firmly held in place by quadrant 26 having a hole in its underside, at stop position for the friction drive and having stops 27 at the quadrant ends to limit the bell crank movements. Hand piece 25 has pivoted thereon lever 28 having at one end, lock pin 29 which, upon squeezing the two together releases the pin 29 from the hole in the under side of quadrant 26 and permits movement of the bell crank in either direction. Geared to shaft 18 by reduction gears 30, 31 is screw 32, which, through slot 33, in bed 1 moves feed bar 3 back and forth by means of yoke 34 thereon. Stops 35 on rod 17 limit the movement thereof. The turning of handwheel 36 on shaft 18 according to a scale on the circumference of wheel 37 on shaft 32 is the old means of calculating an exact cut.

The knife is operated through a series of levers and bars 38, 39, 40 and draw bar 41. Lever 40 is held in place on its pivot 42 by spring 43 (see Fig. 2). This knife operating mechanism is all old in the art.

Figure 20:
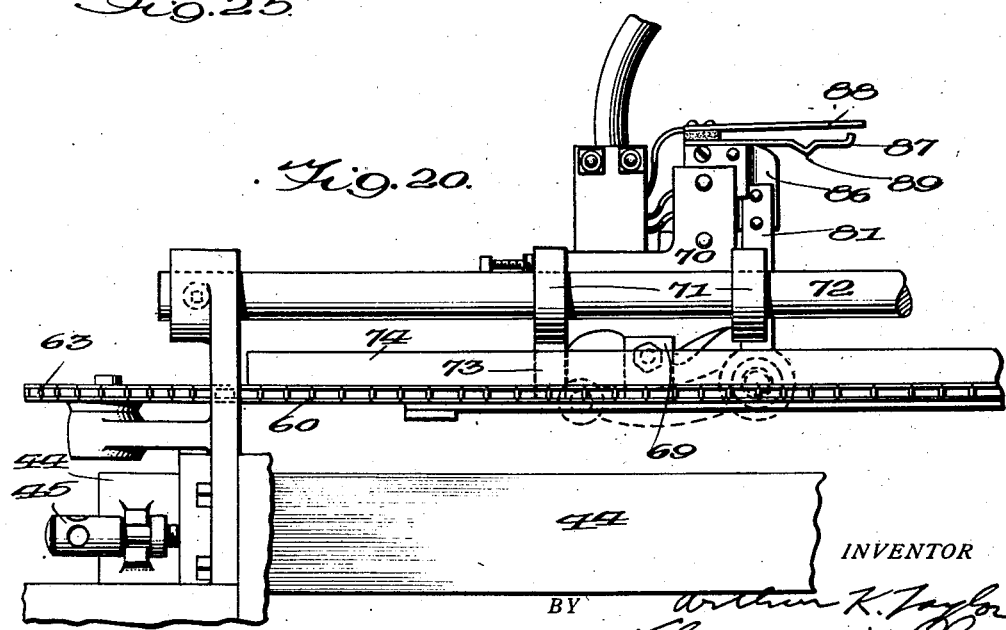
Fig. 20 is a rear view of the support for the energized members, showing its moving chain.

A scale bar 44 is mounted across the top of the machine and to get fine adjustment, it may be moved back and forth by adjusting screw 45, Fig. 20. This scale bar has across the top front thereof dovetailed groove 46 in which correspondingly shaped lugs 47 may be moved back and forth. These lugs 47 are screwed to blocks 48 by screws 49, and thereby, the blocks may be placed where desired along the groove. An additional groove 50 is provided in the scale for a tongue 51 on the blocks to hold them in a proper vertical position. These blocks have stop rollers 52 revolubly mounted at their upper ends, and these rollers have steel rims 53 mounted on insulating cores 54A so that no current may pass from the rim to the roller support.

Additional stop rollers 54 of similar construction may be mounted on blocks 55 which are adjustable across the face of blocks 48 by set screws 56 passing through slots 57. These blocks 55 also have a tongue and groove connection 58 with blocks 48 to prevent relative movement. These stop rollers 54 enable a cut to be made very near to the cut that is governed by the stop rollers 52.

As the feed bar 3 is moved back and forth over the bed 1 of the cutter, it has an upright 59 connected to its upper side, which is connected at its top to chain 60, and this chain passes around a rear sprocket 61 on upright 62 fixed to the back end of bed 1 of the machine. The chain also passes around front sprockets 63, 64 mounted on channel 74 extending across the front of the machine above the scale bar 44. Additional sprockets 65, 66 for the chain give it a T formation. Sprockets 65, 66 may be moved by set screws 67, 68 to keep the chain 60 taut. Fast to the front run of chain 60 is a block 69 projecting from slide 70 and which slide the chain draws back and forth across the front of the machine.

Slide 70 is mounted by rearwardly projecting arms 71 to slide back and forth on bar 72. To prevent rotation of the slide around bar 72, an inverted U shaped saddle 73 slides on the front upright of channel 74. To the front of this saddle 73 a member projects downwardly, to the end of which a scale reading device 75 is fixed. This device has a window with a wire 76 therein so that accurate readings of the location of the slide may be made on scale bar 44. Likewise, accurate readings of the location of blocks 48 on the scale may be made by index 77.

A bar 78 having a passage 79 therethrough projects to the left side of slide 70 and is screwed to the front thereof. This bar has at its end a bearing for hollow bolt 80 passing therethrough. The bolt supports at either end bell cranks, 81 and 82, and it is secured in place by nut 83. The bolt 80 has an opening in its side wall communicating with the passage 79 which intersects the bolt bearing, thereby forming a passage for wires both through the bolt and from the inside of the bolt to the passage 79 in the bar.

Bell crank 81 has at its lower end a small roll 84 and a larger roll 85. These rolls are so placed vertically that when their supporting slide 70 moves along bar 72 they contact with stop rollers 52 and swing the bell crank about its supporting bolt 80. The upper end of this bell crank 81 has a piece of insulating material 86 attached to it, which pushes a spring contact member 87 into contact with a stationary contact member 88, by striking hump 89 on the spring member. This takes place when the bell crank is turned on its pivot by roll 85 striking roller 52. To accurately adjust the resting position of bell crank 81 a set screw 90 is mounted on the slide 70. Spring 91 normally holds the upper arm of the bell crank against its set screw 90.

Bell crank 82 likewise has rolls 92 and 93, which ride over stop rollers 54, its upper end also has a rest set screw 94 and retaining spring 95.

Rolls 84, 85, 92 and 93 are insulated from their bearings, so are contact members 87 and 88 insulated from each other and from their supports.

As paper feed bar 3 moves back and forth over bed 1, slide 70 moves back and forth over rod 72 and rolls 84, 85, 92 and 93, contact with such stop rollers 52 and 54 as may be placed in their paths.

Constantly rotating shaft 10 has thereon a sprocket 96, driving chain 97, which drives a sprocket on shaft 98 journaled on box 99 which is bolted to the floor in back of the paper cutting machine. Shaft 98 drives shaft 100 through bevel gears 101. At about the center of shaft 100, in box 99, a sprocket wheel 102 drives a chain which drives sprocket 103 on shaft 104. Shaft 104 has thereon oppositely directed worms 105, and 106, which turn worm gears 107 and 108 which are fast on stub shafts 109 and 110. Next to the front of box 99, Fig. 10, ratchet wheels 111 and 112 are shown, fast to stub shafts 109 and 110, and they rotate constantly toward each other at the top, being driven by the mechanism above described, from constantly rotating shaft 10.

Shaft 100 has above it shaft 113, which has on one end gear 114 and on the other gear 115, both loosely mounted thereon. Gear 115, through a speed reduction train of gears 116, beginning on shaft 100, is reduced in speed, so that it makes a revolution about once to every twenty-five revolutions of gear 114, which is likewise driven from a gear 117, on shaft 100. These gears rotate constantly, being driven through the mechanism above described by constantly rotating shaft 10. These gears, 114 and 115, have screwed thereto similar clutch cylinders 118, which have clutch members 119 slidable therein. These members are urged out of cylinders 118 by springs 120, the tension of which may be adjusted by screws 121 passing through the gears and cylinders and pressing on plugs 122 which bear against the spring. These screws 121 also serve to turn clutch members 119 with their cylinders 118. Screws 121 may be reached through holes in the ends of box 99 and adjusted at will.

Counterbalancing springs 120, are springs 123 on the outside of the clutch cylinders and members, on posts 124 and 125, respectively, of these parts. Clutch members 119 have clutch faces 126 thereon, which contact with clutch faces 127 on clutch 128 when the clutch is moved into contact with them. Clutch 128 is longitudinally slidably keyed to shaft 113, by key 129.

Upon putting one face of clutch 128 into engagement with one of the clutch members 119, which are constantly rotating, shaft 113 is rotated, which, through shock absorber 130, drives chain 131 which is attached through conventional clutch 132, to screw 32. This conventional clutch 132 is useful only when it is desirable to entirely disconnect the automatic drive, and not in the ordinary and intended operation of the machine. When screw 32 is rotated through this automatic mechanism, friction roller 15 is in neutral position on disk 14. Shock absorber 130 has an outer cup 133, Figs. 15 and 16 containing a compression spring 134 which bears against a lug 136 fast to the cup 133 at one end, and at the other against a lug 135 on plate 137 pinned to shaft 113 at 138. Cup 133 has a sprocket 139 thereon by which chain 131 is driven. When shaft 113 is driven to forward feed bar 3, lugs 135 and 136 separate, and compress spring 134. When screw 32 is stopped suddenly, spring 134 absorbs the momentum of shaft 113.

Collar 140, of clutch 128, rides around knob 141 on lever 142, pivoted at 143 on box 99. The other end of lever 142 has an elongated opening 144 therein in which projecting pin 145 on bar 146 works. Bar 146 is mounted in U brackets 147 on the ends of box 99. Longitudinal movement of bar 146 will, therefore, throw lever 142 and move the clutch 128 into either speed or into neutral. Projecting from the top of box 99 is a standard 148 on which is pivotally mounted a bar 149. Bar 149 has a roller 150 rotatably mounted thereon and projecting to one side. The other end of bar 149 is resiliently held down toward the box 99 by spring 151 on standard 152 fast to the top of box 99 and passing through a slightly elongated hole in the end of bar 149. Bar 146 has three notches in its upper face, 153, 154, and 155, into which roller 150 sinks, by pressure of spring 151, when bar 146 has been moved to let the roller 150 enter the notch and the spring pressure is enough to stop the momentum of the bar 146. These notches and the spring held roller also hold the clutch 128 into a firm, but yielding grip with the clutch face desired. The center notch 154 holds the clutch in neutral, notch 153 holds the clutch in high speed, gear 114 driving, and notch 155 holds the clutch in low speed, gear 115 driving the paper feed bar 3.

This movement may be imparted by several electro magnets operating pawls to engage ratchet wheels 111 and 112. Bar 146 has two rollers 156 and 157 on pintles projecting from its side. Brackets 158 and 159 are loosely mounted to rock on shafts 109 and 110 respectively, between worm wheels 107 and 108 and ratchet wheels 111 and 112 respectively. The upper end of each of these brackets has an elongated opening in it, 160, fitting over rollers 156 and 157, so that rocking movement imparted to either bracket, with the other moving freely, will move bar 146 longitudinally.

Bracket 158 has pivoted thereon a pawl 161, the bite 162 of which coacts with ratchet wheel 111. The bite is normally held out of engagement with the wheel by spring 163. Upon energizing electromagnet 164, supported at its top on cross bar 165 of bracket 158, the iron block 166 on the upper end of pawl 161 is drawn to the magnet, and the bite 162 engages the constantly rotating ratchet wheel 111 and swings bracket 158 over, and thereby, moves bar 146 and lever 142 to move the clutch 128. A cam 166A on box 99 is so placed that roller 167 on bite 162 contacts with it after the required movement of bracket 158 and pulls the bite 162 from contact with ratchet wheel 111, thereby letting the ratchet wheel continue its rotation and leaving bracket 158 in its new position. This magnet and its accompanying mechanism throws the clutch 128 from neutral, or stop position, for its driving of the paper feed bar 3, into high speed, forward, driven by gear 114.

Bracket 158 has pivoted thereon a similar pawl 168, bite 169, held withdrawn from wheel 111 by spring 170, pulled into engagement with wheel 111 by magnet 171 on bar 165 acting on iron block 172 on the other end of pawl 168, and pulled out of engagement by cam 173 on box 99 when roller 174 on bite 169 contacts with it. This magnet 171 with its accompanying mechanism throws the clutch 128 from its slow driving position, being driven by gear 115, into neutral, or stop position.

Bracket 159 has a single, similar pawl 175 pivoted thereon, having a bite 176 held withdrawn from ratchet wheel 112 by spring 177, and being pulled into engagement with ratchet wheel 112 by electromagnet 178 mounted on the top of bracket 159 acting on iron block 179 on the other end of pawl 175. Pawl 175 may be pulled out of engagement with its ratchet wheel 112 by cam 180 on box 99 when roller 181 on bite 176 contacts with it. This magnet 178, with its accompanying mechanism throws the clutch 128 from its high speed drive, by gear 114, to its low speed drive, driven by gear 115.

Figure 25:
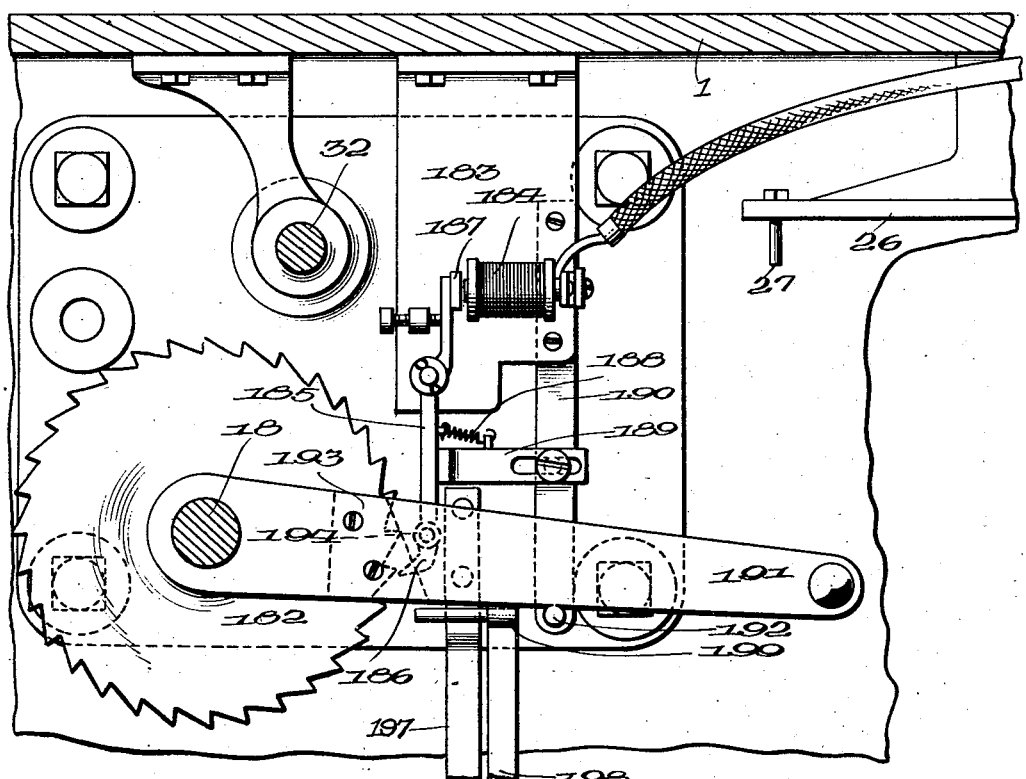
Fig. 25 is a front view, partly in section, of the paper forwarding drive stop.

To positively stop the forwarding moving rotation of screw 32 which directly moves feed bar 3 forward, a ratchet wheel 182 is fixed on shaft 18, just back of hand wheel 36, as shown in Figs. 5 and 25. Bed 1 of the machine has projecting from its under side a bracket 183 on which electromagnet 184 is mounted. Pawl 185 has bite 186, which engages ratchet wheel 182 when the magnet is energized, by pulling on iron block 187, and it is normally held out of engagement with wheel 182 by spring 188 on the adjustable pawl stop support 189 on depending support 190. Lever 191 is pivotally mounted on shaft 18 and it normally rests on projection 192 on support 190. Lever 191 has a cam 193 on its back, which engages with roller 194 on bite 186 of pawl 185 when the lever is raised and pulls the bite out of contact with ratchet wheel 182 to permit further forward movement of feed bar 3.

When a cut is to be made draw bar 41 is pulled to the operator's left; this throws a clutch, and gear 195 on shaft 196 (see Fig. 7) is turned just one revolution to bring the knife down and back up, at which instant the clutch is automatically disconnected. This is old in the art. Depending support 197 has pivoted thereon a lever 198. The upper end 199 of this lever has a lifting and sliding contact with lever 191. The lower end of the lever has a projection 200 which contacts with cam 201 on shaft 196 before the completion of the upward stroke of the knife, to pull pawl 185 from engagement with ratchet wheel 182 to allow further forward movement of feed bar 3.

When the forward movement of feed bar 3 stops, electromagnet 202, on the front of the machine, Figs. 23 and 24, is energized. Lever 203 is normally held by weight 204 so that point 205 would prevent the passage of screw stop 206 on draw bar 41. Iron block 207 on lever 203, on being pulled down by magnet 202, allows draw bar 41 to be pulled to the left to make a cut. When the magnet is not energized, the lever 203 prevents a cut from being made. Spring 208, adjusted by set screw 209, forms a support for projection 210 from lever 203 to hold the lever in proper position. When it is desired not to use this electromagnet stop, lever 203 may be permanently held out of contact with stop 206 by member 211, pivoted at 212, being pulled tightly under the arm of the lever supporting weight 204.

Just prior to the completion of the upward movement of the knife and of the clamp, the feed bar 3 begins to move forward, and the switch for closing the circuit for this purpose is shown in Fig. 7 in which a cam of insulating material 213 is located on shaft 196 at the desired place to push spring contact member 214 into contact with a stationary contact member 215, by striking angle 216 of the spring member. Members 214 and 215 are insulated from their mounting 217 on the front of the machine.

Current through the complete circuit may be broken temporarily by squeezing hand grip 25. On the inner end of lever 28 of this grip a member 218 is rigidly mounted in insulated material. Squeezing the grip pulls this member down and this pulls the center bar from knife switch 219 mounted on and insulated from bell crank 24.

Another switch, 220, under the machine, also may be used to break the circuit at any time, especially when the machine is not in use.

When the end of the paper that is being cut is reached, the travel of the feed bar 3 cannot be resumed by the electrical means, because at the end of the run of feed bar 3, spring contact member 225 is moved from stationary contact member 226, both mounted on insulated block 227 on the inside of the side of the frame of the machine, by an insulated projecting lug 228 on feed bar 3 thus breaking the circuit, see Fig. 2. When the forward movement has been stopped by breaking the circuit before the end of the run, it may be resumed by pressing push button 221 on the front of the machine.

Should the feed bar 3 be moving forward driven by the chain 131, and strike clamp 5, the clutch faces 126—127 will slip, relatively to each other, so that no damage will be done.

When it is desired to move the feed bar 3 back, hand grip 25 is squeezed, thus breaking the circuit through the apparatus, and bell crank lever 24 is moved to reverse the direction of movement of the feed bar 3 as it has always been done prior to this invention. The clutch 128 is in neutral when the automatic drive is not operating, and consequently, when the circuit is then broken by squeezing hand grip 25, feed bar 3 may be moved back through the movement of roller 15 on disk 14, as formerly, without affecting the automatic drive.

Lights, red, 222, and white, 223, are also in the circuits, the red light is lit when the clutch 128 is shifted to low speed, the white light is lit when the clutch 128 is shifted to neutral, or stop position.

The circuits for effecting the operations above described are shown in Fig. 26. A battery 224 supplies the current. On the right side of Fig. 26, this current then goes through hand grip switch 219, permanent cut-off switch 220, cut-off switch 225, 226, and around to all three electromagnets 164, 171 and 178 in box 99.

On the left side of the battery, current goes up first to either push button switch 221 or switch 214, 215, whichever is closed and then to electromagnet 164 in box 99 to start the feed bar 3 forward at high speed. Switches 221 and 214, 215 are then cut out, and the current passes on up the wire to switch member 88, which when closed by spring member 87, by roll 85 striking roller 52 and thereby rocking the bell crank 81, passes the current to electromagnet 178, lighting light 222, red, on the way. Electromagnet 178 then operates to shift clutch 128 to low speed forward for feed bar 3.

When slide 70 has passed on a little further, breaking circuit between members 87 and 88, and completing the circuit through stop roller 52 or 54, each shown in the diagrammatic view Fig. 26 as two lines, with the circuit therethrough closed, the roller 52 or 54 closes the circuit between rolls 84 and 85 or 92 and 93 respectively. When this happens, draw rod magnet 202 is energized to permit a cut to be made, white light 223 is lit to show that the contact is made, electromagnet 184 is energized to positively lock feed screw 32, and electromagnet 171 is energized to throw clutch 128 into neutral to stop the forward drive of feed bar 3.

The cut is then made, and while the knife is rising, switch 214, 215 is again closed and the above operation is repeated. Were the knife up and the feed bar not started by switch 214, 215, it could be started by push button switch 221.

After all cuts are made, the feed bar 3 is run back by throwing bell crank 24 in the required direction, by first squeezing hand grip 25, which breaks the current through switch 219 and prevents harm to the mechanism.

Part of the invention may be used without the rest, when it is desired to have it only semi-automatic. The wires leading to box 99 are then disconnected, so is clutch 132. The forward movement to feed bar 3 is given through its old driving means, by manipulation of bell crank 24 in the required direction. When the paper pushed by feed bar 3 has gotten near the place for the required cut, switch 87, 88 is closed, and the operator sees the red light, 222, lit, which indicates danger. He then throws bell crank 24 to neutral and turns screw 32 by means of hand wheel 36 until roller 52 or 54 completes the circuit between rolls 84 and 85 or 92 and 93 respectively, when light 223 is lit, draw rod magnet 202 is energized to permit a cut and magnet 184 is energized to positively stop rotation of screw 32 to forward feed bar 3. The cut is then made, and, the lever 191 may be manually lifted to throw out pawl 185, and the screw 32 may again be operated by its old driving mechanism.

While the illustrated machine is especially designed for the cutting of sheet material in the manner disclosed, it will be understood that my invention is not so limited in its application and that the invention and many of its important features may have other and various applications and uses.

I claim:

1. A sheet cutting machine including means for cutting sheet material, means for forwarding the sheet material relatively to the cutting means, means to stop said forwarding means at any predetermined point including members movable in a path proportionately to the travel of said forwarding means coacting with a stop means settable along said path at any predetermined point, said stop means coacting successively with said movable members to first slow down and then stop said forwarding means.

2. A sheet cutting machine including means for cutting sheet material, means for forwarding the sheet material relatively to the cutting means, means for successively stopping said forwarding means including members movable in a path across the front of the machine proportionately to the travel of said forwarding means and substantially perpendicularly to the movement thereof, members adjustable in said path across the front of the machine to indicate successive stopping points for said forwarding means and engageable with said movable members to stop said forwarding means at said indicated stopping points.

3. A sheet cutting machine including means for cutting sheet material, means for forwarding sheet material relatively to the cutting means, means for successively stopping said forwarding means including members movable in a path across the front of the machine by and substantially perpendicularly to the movement of the forwarding means, a member adjustable in said path across the front of the machine to indicate a stopping point for said forwarding means and engageable with said movable member to stop said forwarding means at said indicated stopping point.

4. A sheet cutting machine including means for cutting sheet material, means for forwarding sheet material relatively to the cutting means, means for successively stopping said forwarding means including members movable in a path across the front of the machine proportionately to the travel of said forwarding means and substantially perpendicularly to the movement thereof, members adjustable in said path across the front of the machine to indicate successive stopping points for said forwarding means and engageable with said movable members to stop said forwarding means at said indicated stopping points, and means to indicate the near approach of said movable members to said indicated stopping points.

5. A sheet cutting machine including means for cutting sheet material, means for forwarding sheet material relatively to the cutting means, means for stopping said forwarding means including members movable in a path proportionately to the travel of said forwarding means, a member adjustable in said path to indicate a stopping point for said forwarding means and engageable with said movable members to stop said forwarding means at said indicated stopping point, said movable members being mounted on a pivoted bracket under tension to hold them, when they pass, in engagement with said adjustable member.

6. In a machine for forwarding material successively to a stopping point for operating thereupon, a clutch, a constantly driven clutch face to forward the material by gearing attached thereto, successive means to move said clutch into contact with said face to forward the material, means operated by the completion of an arbitrary predetermined forward movement of the material to set said clutch into a neutral or stop position.

7. In a machine for forwarding material successively to a stopping point for operating thereupon, a clutch interposed between two differently speeded constantly driven clutch faces, either of which may forward the material by gearing attached thereto, successive means to move said clutch into contact with one of said faces to forward the material, means operated by the completion of an arbitrary predetermined forward movement of the material to move said clutch into contact with the other of said faces to forward the material at a different speed, and means to set said clutch into a neutral, or stop, position between said faces.

8. A sheet cutting machine including means for cutting sheet material, means for successfully forwarding sheet material relatively to the cutting means, means to indicate successive predetermined stopping points for said forwarding means including members movable in a path across the front of the machine proportionately to the travel of said forwarding means and substantially perpendicularly to the movement thereof, members adjustable in said path across the front of the machine engageable with said movable members at said predetermined stopping points.

9. A sheet cutting machine including means for cutting sheet material, means for successively forwarding sheet material relatively to the cutting means, means to indicate successive predetermined stopping points for said forwarding means including members movable in a path across the front of the machine proportionately to the travel of said forwarding means and substantially perpendicularly to the movement thereof, members adjustable in said path across the front of the machine engageable with said movable members at said predetermined stopping points, and means to indicate the near approach of said movable members to said predetermined stopping points.

10. A sheet cutting machine including means for cutting sheet material, means for intermittently forwarding the sheet material relatively to the cutting means, an elongate flexible member moving lengthwise in synchronism with said forwarding means and having means moved therewith electrically coacting successively with a plurality of separate stop means each placed in any predetermined position along the path of movement of said flexible member to determine the amount of movement thereof.

11. A sheet cutting machine including means for cutting sheet material, means for forwarding the sheet material relatively to the cutting means including a feed bar and an elongate flexible member having one run thereof extending transversely across the front of the machine and movable lengthwise thereacross in synchronism with the travel of said feed bar and means thereon and on the front of the machine cooperating to indicate successive stopping points of said forwarding means.

12. A sheet cutting machine including means for cutting sheet material, means for forwarding the sheet material relatively to the cutting means, at either of two different speeds, means electrically controlled for starting and stopping said forwarding means and for shifting the speed thereof from high to low, an electrical device movable in a path proportionately to the travel of said forwarding means, means settable in said path at any predetermined point for coacting with said electrical device, first, to operate said electrical control means to change the speed of the forwarding means to low speed, then to permit a further predetermined travel at low speed, and finally to stop the forwarding means.

13. A sheet cutting machine including means for cutting sheet material, means for forwarding the sheet material relatively to the cutting means, means for successively stopping said forwarding means including a member movable in a path across the front of the machine proportionately to the travel of said forwarding means, means arranged along said path across the front of the machine for indicating successive stopping points for said forwarding means at any desired positions, said indicating means cooperating with said movable member to stop said forwarding means at said indicated stopping points.

14. A sheet cutting machine including means for cutting sheet material, means for forwarding sheet material relatively to the cutting means, means for successively stopping said forwarding means including a member movable in a path across the front of the machine, means arranged along said path across the front of the machine at a position corresponding with a desired stopping point for said forwarding means, said indicating means cooperating with said movable member to stop said forwarding means at said indicated stopping point.

15. A sheet cutting machine including means for cutting sheet material, means for forwarding sheet material relatively to the cutting means, means for successively stopping said forwarding means including a member movable in a path across the front of the machine proportionately to the travel of said forwarding means, means arranged along said path across the front of the machine for defining successive stopping points for said forwarding means at any desired positions, said stop defining means cooperating with said movable member to stop said forwarding means at said defined stopping points, and means to indicate the near approach of said movable member to said defined stopping points.

16. A sheet cutting machine including means for cutting sheet material, means for successively forwarding sheet material relatively to the cutting means, means to indicate successive predetermined stopping points for said forwarding means including a member movable in a path across the front of the machine proportionately to the travel of said forwarding means and means arranged along said path across the front of the machine cooperating with said movable member at predetermined points corresponding to desired cuts for stopping the said forwarding means.

17. A sheet cutting machine including means for cutting sheet material, means for successively forwarding sheet material relatively to the cutting means, means to indicate successive predetermined stopping points for said forwarding means including a member movable in a path across the front of the machine proportionately to the travel of said forwarding means, means arranged along said path across the front of the machine cooperating with said movable member at predetermined points corresponding to desired cuts for stopping the said forwarding means, and means to indicate the near approach of said movable member to the said predetermined points on the said stop indicating means.

18. In a movement determining mechanism for locating successive operations, an electrical contact mechanism comprising a pair of spaced apart contact members moving one ahead of the other in a fixed pathway, a succession of adjustable conductors in the pathway of and each engageable successively with said contact members, each conductor having a surface, which upon engagement with said contact members, bridges the gap therebetween and thereby completes a circuit therethrough, the first of said contact members breaking said circuit, in passing, substantially upon engagement of the second of said contact members with each conductor, said contact members being mounted on a pivoted bracket under tension to hold them extended against each conductor in passing and means to stop the movement of said moving contact members upon engagement with each conductor initiated by said circuit, and means to release said stopping means upon completing a located operation and to allow the movement of said moving contact members past each conductor.

19. A sheet cutting machine including means for cutting sheet material, means for forwarding the sheet material to the cutting means, and means for indicating the position of the forwarding means comprising an endless elongate flexible element having one run extending crosswise of the machine at the front thereof and moving crosswise of the machine proportionately to the travel of the forwarding means, and another run extending parallel to the line of movement of the forwarding means, and an operative connection between the forwarding means and the latter run of said flexible element.

20. A sheet cutting machine including means for cutting sheet material, a feed bar for forwarding the sheet material to the cutting means, and means for indicating the position of the feed bar with respect to the cutting means comprising an endless elongate flexible element attached at one point to said feed bar, and means for movably supporting said endless element in the form of the letter T with the cross of the T extending transversely of the front of the machine.

ARTHUR K. TAYLOR.